United States Patent [19]

McCann et al.

[11] Patent Number: 4,792,690
[45] Date of Patent: Dec. 20, 1988

[54] ULTRAVIOLET LASER BEAM MONITOR USING RADIATION RESPONSIVE CRYSTALS

[75] Inventors: Michael P. McCann, Oliver Springs; Chung H. Chen, Knoxville, both of Tenn.

[73] Assignee: University of Tennessee Research Corporation, Knoxville, Tenn.

[21] Appl. No.: 88,076

[22] Filed: Aug. 21, 1987

[51] Int. Cl.$^4$ .................................................. G01J 5/48
[52] U.S. Cl. ................................ 250/474.1; 250/473.1
[58] Field of Search ............... 250/474.1, 473.1, 472.1, 250/372

[56] References Cited

U.S. PATENT DOCUMENTS

| | | | |
|---|---|---|---|
| 2,673,934 | 3/1954 | Friedman | 250/474.1 |
| 2,689,308 | 9/1954 | Land | 250/474.1 |
| 3,012,142 | 12/1961 | Etzel | 250/336.1 |
| 3,021,286 | 2/1962 | Etzel et al. | 436/58 |
| 3,709,692 | 1/1973 | Haase et al. | 430/604 |
| 3,887,471 | 6/1975 | Stotlar | 250/338 |
| 4,261,662 | 4/1981 | Bluford, Jr. et al. | 356/121 |
| 4,320,462 | 3/1982 | Lund et al. | 364/525 |
| 4,494,003 | 1/1985 | Hager et al. | 250/474.1 |
| 4,596,461 | 6/1986 | DeRosa et al. | 356/121 |

FOREIGN PATENT DOCUMENTS

| | | | |
|---|---|---|---|
| 3002559 | 7/1981 | Fed. Rep. of Germany | 250/372 |
| 17666 | of 1903 | United Kingdom | 250/474.1 |

OTHER PUBLICATIONS

"Radiosensitivity of Alkali-Halide Crystals", by H. Freidman and G. P. Glover, published in *Nucleonics*, (Jun. 1952).

"Photochromic Glasses: Properties and Application", by G. P. Smith, published in *American Journal of Optometry & Archives*, vol. 44, No. 6, (Jun. 1967).

Primary Examiner—Janice A. Howell
Assistant Examiner—Constantine Hannaher
Attorney, Agent, or Firm—Luedeka, Hodges & Neely

[57] ABSTRACT

An apparatus and method for monitoring an ultraviolet laser beam includes disposing in the path of an ultraviolet laser beam a substantially transparent crystal that will produce a color pattern in response to ultraviolet radiation. The crystal is exposed to the ultraviolet laser beam and a color pattern is produced within the crystal corresponding to the laser beam intensity distribution therein. The crystal is then exposed to visible light, and the color pattern is observed by means of the visible light to determine the characteristics of the laser beam that passed through crystal. In this manner, a perpendicular cross sectional intensity profile and a longitudinal intensity profile of the ultraviolet laser beam may be determined. The observation of the color pattern may be made with forward or back scattered light and may be made with the naked eye or with optical systems such as microscopes and television cameras.

17 Claims, 2 Drawing Sheets

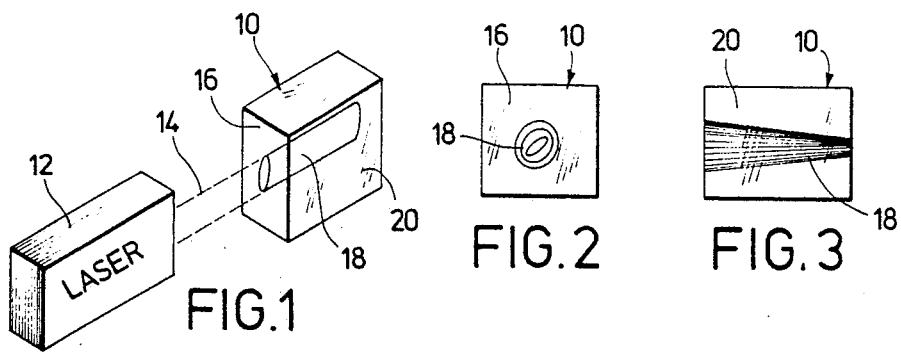
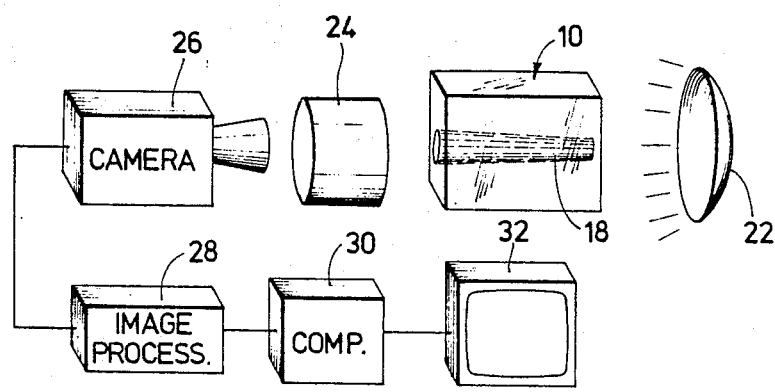
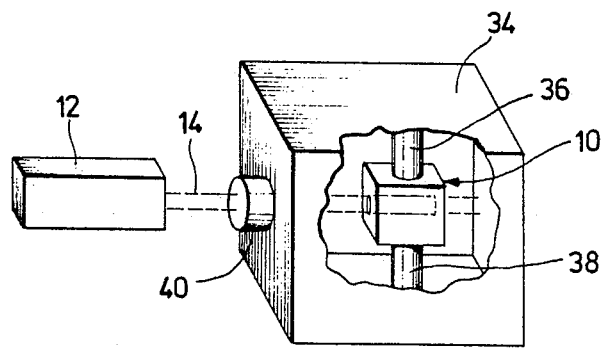

ULTRAVIOLET LASER BEAM MONITOR USING RADIATION RESPONSIVE CRYSTALS

The Government has rights in this invention pursuant to a contract awarded by the U.S. Department of Energy.

FIELD OF THE INVENTION

The present invention relates to an apparatus and method for monitoring the intensity distribution of an ultraviolet laser beam, and particularly relates to monitoring the intensity distribution of an ultraviolet laser beam in three-dimensions using a radiation sensitive crystal.

BACKGROUND

A need exists for an easy, accurate and quick technique for monitoring ultraviolet lasers. Monitoring the beam profile of an ultraviolet laser beam is critical in many applications and laser developments. Ultraviolet lasers are used in a wide variety of applications and experiments including laser surgery, laser welding, laser fusion, laser isotope separation, atomic and molecular physics research and laser spectroscopy. In practically all these applications, it is important have accurate beam profile measurements in order to achieve efficient and safe operation and meaningful experimental results.

Known methods for monitoring laser beam profiles are generally difficult, expensive and intrusive of the laser beam. For example, a laser beam profile could be obtained by placing photodiodes in the beam to observe it, and reticon multi-channel plates are made for this purpose. There are numerous drawbacks to this technique. The first is cost. The photodiode plates are expensive and computers or other sophisticated electronics are required for data readout. Operation is difficult. The plates must be carefully placed in the beam. Then, the plate must be moved parallel to the beam and multiple samples must be taken in order gather information as to the longitudinal beam profile. The placement and movement of the plates must be done precisely and are sources of difficulty and error. Also, the damage threshold of such devices is generally low (about 0.1 mJ/cm$^2$) and the dynamic range is narrow compared to the present invention. Finally, this technique of monitoring a laser beam invades and blocks the laser beam which may be undesirable in some applications.

Another known technique for measuring or monitoring ultraviolet laser beams uses photographic film placed in the path of the laser beam. Again this technique is difficult, requires precise positioning of the film and requires multiple samples of the laser beam at different positions to obtain longitudinal profile information of the beam.

SUMMARY OF THE INVENTION

The present invention overcomes these and other problems associated with ultraviolet laser beam monitoring by monitoring the ultraviolet laser beam with an ultraviolet sensitive crystal. Preferably, this crystal is an alkali halide crystal, such as potassium chloride doped with thallium, that will produce a color pattern when exposed to ultraviolet light. The crystal is disposed in the path of an ultraviolet laser beam for a selected period of time and a color pattern is formed within the crystal that corresponds to the intensity pattern of the laser beam as it passes through the crystal. In the preferred embodiment, the crystal has a cubic or rectangular shape with polished planar faces on all sides so that the laser beam may enter and exit the crystal perpendicularly and the color pattern within the crystal may be observed substantially perpendicularly through the planar faces.

To observe the color pattern in the crystal one can simply expose the crystal to visible light and observe it with the naked eye. The density pattern of the color pattern in the crystal is proportional to the square of the laser beam intensity, but this exponential correlation may not be a factor in many observations. To determine the perpendicular cross sectional profile of the laser beam, the crystal is observed in a direction parallel to the path of the laser beam as it passed through the crystal and, to determine the longitudinal profile, the crystal is viewed along a direction substantially perpendicular to the laser beam path through the crystal. The second mentioned observation is essentially a side view of the laser beam longitudinal profile and it is most suited for determining laser beam divergence or convergence.

To improve the accuracy of the observation, a visible light optical system, such as a microscope, may be used, or a television camera, with or without a microscope, may be used to observe the color pattern in the crystal. Also, the crystal may be contained within a box having a shutter for admitting the laser beam in order to more precisely control the exposure of the crystal to the laser beam.

It should be noted that the color pattern in the crystal is three-dimensional and this three-dimensional data was obtained without moving the crystal and without multiple sampling as required by prior art monitors discussed above. Also, the readout of the data may be obtained without the aid of a computer or other expensive electronic equipment. The crystal is simply observed with the naked eye. Thus, the present monitoring system is suitable for use by persons who are not skilled in the monitoring of lasers.

BRIEF DESCRIPTION OF THE DRAWINGS

The present invention may be best understood by reference to the following Detailed Description of a preferred embodiment when considered in conjunction with the Drawings in which:

FIG. 1 is a perspective view of an ultraviolet laser illuminating an alkali halide crystal;

FIG. 2 is a front view of the crystal in which the color pattern in the crystal is viewed in a direction parallel to the laser beam path through the crystal;

FIG. 3 is a side view of the crystal in which the color pattern is viewed in a direction perpendicular to the laser beam path throgh the crystal;

FIG. 4 is a diagrammatic view of an optics and video system that may be used to view the crystal after it has been exposed to the laser;

FIG. 5 is a diagrammatic view of a crystal mounted in a black box and exposed to a laser beam through a shutter.

DETAILED DESCRIPTION

Figure 6:
FIG. 6 is a photograph of a potassium chloride crystal in which a color pattern has been formed by an ultraviolet laser beam.

Referring now to the drawings in which like reference characters designate like or corresponding parts through the several views, there is shown in FIG. 1 an alkali halide crystal 10 being illuminated by an ultraviolet laser 12 that is producing a laser beam 14. The laser 12 may be any of a number of ultraviolet or vacuum ultraviolet type lasers and it may be a frequency tripled (355 nanometers) and quadrupled (266 nanometers) ND:YAG laser.

The preferred crystal 10 is a potassium chloride crystal doped with thallium although other alkali halide crystals such as sodium chloride, potassium bromide and cesium bromide may be used. Also, it is preferred to use a cubic or rectangularly shaped crystal with polished parallel planar surfaces. In FIG. 1, the laser beam 14 impinges upon the front surface 16 and creates a color pattern 18 within the crystal 10 that is also visible through the side surface 20 of the crystal 10. After the crystal 10 has been exposed to the ultraviolet laser beam 14, it may be viewed to determine the characteristics of the beam. In FIG. 2, there is a front view of the crystal 10 taken perpendicularly to the surface 16. In this view, the color pattern 18 reveals that the beam, in perpendicular cross-section, has an oval hole in its center and is somewhat donut shaped. Also, there are regions of increased intensity that appear as curved lines within the pattern 18.

FIG. 3 is a side view of the crystal 10 taken perpendicularly to the surface 20. In this view, it is seen that the color pattern 18 is converging and, thus, by simple observation it is possible to determine that the laser beam was converging as it went through the crystal. For most lasers, the degree of convergence in FIG. 3 is exaggerated and one would not normally expect a laser beam to converge at the rate shown. This convergence is shown for purpose of illustration only.

Although the crystal 10 is suited for observation by the naked eye in order to determine the characteristics of the monitored laser beam, it may be desired to more accurately monitor and process the information contained in the crystal. FIG. 4 shows a system that made by employed to more accurately view the crystal 10 after it has been exposed to the laser beam 14. In this system, a visible light source 22 is used to illuminate the crystal 10, and either forward or back scattered light is observed to determine the shape and characteristics of the color pattern 18 within the crystal 10. In the example shown in FIG. 4, optics system 24 is positioned to view forward scattered light that is transmitted from the source 22 through the crystal 10 and the optics system 24 will be observing a cross sectional view similar to that shown in FIG. 2. If desired, in some applications, the optics system 24 could include a microscope, or the system 24 could simply be the lens of a television camera.

In FIG. 4, a television camera 26 is positioned to view the crystal 10 through the optics system 24 and, thus, create an electrical image of the color pattern 18. It will be understood that the television camera could be any conventional television camera, such as a solid state camera using a photodiode array.

The image from the camera 26 is transmitted to a digital image processor 28, such as a Perceptics 9200, and the image is digitized. The digital form of the image may be operated upon the processor 28 and a computer 30 to which the processor 28 is connected. Using the image processor 28 and computer 30, the image of the color pattern 18 may be operated upon to enhance the data or to eliminate noise from the image. Within the computer 30, the image of the color pattern 18 may be compared to the background light of the image and it may be compared to previously stored color and intensity charts in the computer to determine the strength and pattern of the laser beam 14. Also, if desired, the image of the pattern 18 or the processed image of the pattern 18, may provide an output on a video screen 32 and the image of the pattern 18 may be displayed.

Referring now to FIG. 5, there is shown a black box 34 that diagrammatically illustrates the type of container that may be used to facilitate the control of the exposure of the crystal 10 to radiation. In this embodiment, the box 34 is constructed of a material that is opaque to both visible and ultraviolet light, but for some applications the box 34 is constructed of glass so that it is opaque only to ultraviolet light.

The crystal 10 is mounted within the box 34 by suitable supports 36 and 38. In this embodiment, the supports 36 and 38 simply clamp the crystal in the appropriate position within the box 34. A shutter 40 is mounted on the box for selectively admitting the laser beam 14 into the box 34 for predetermined periods of time. By using the shutter 40 and the black box 34, the exposure of the crystal 10 to the ultraviolet laser beam 14 can be carefully controlled and the amount of background noise and radiation can be minimized.

Referring to the photograph that is labeled as FIG. 6, there is shown an actual potassium chloride crystal showing the color pattern that has been created by the exposure of the crystal to the laser beam. In this photograph, the shadow of the crystals appear in the foreground illustrating that both back scattered and forward scattered light may be used to observe the pattern within the crystal.

Although particular embodiments have been described in the foregoing Detailed Description, it will be understood that the invention is capable of numerous rearrangements and substitutions without departing from the scope of the invention as set forth in the appended claims.

What is claimed is:

1. A method for monitoring an ultraviolet laser beam comprising the steps of:
   providing a substantially transparent crystal adapted to produce a color pattern in the body of the crystal when ultraviolet radiation is directed therethrough;
   positioning the crystal within the path of the ultraviolet laser beam;
   exposing the crystal to the ultraviolet laser beam to produce a color pattern in the crystal wherein the color pattern produced is three-dimensional and corresponds to the spatial distribution of the laser beam transmitted through the crystal;
   exposing the crystal and color pattern to light so as to illuminate the color pattern; and
   observing the light from said crystal and color pattern to determine preselected spatial distribution characteristics of the laser beam that passed through the crystal.

2. The method of claim 1 wherein the crystal is exposed to an ultraviolet laser beam having a intensity within a range of about 1 mW/cm$^2$ to about 1 GW/cm$^2$.

3. The method of claim 1 wherein said crystal is exposed to visible light and the visible light from the crystal is observed.

4. The method of claim 1 wherein the light from the crystal is observed in a direction parallel to the path of the laser beam through the crystal in order to view a representation of a perpendicular cross section of the beam to determine a perpendicular cross sectional intensity distribution profile of the laser beam.

5. A method for monitoring an ultraviolet laser beam comprising:
   disposing in the path of the ultraviolet laser beam a substantially transparent crystal that will produce a color pattern in response to ultraviolet radiation;
   exposing the crystal to the ultraviolet laser beam to produce a color pattern in the crystal corresponding to the laser beam intensity distribution;
   exposing the crystal and color pattern to light; and
   observing the light from said crystal and color pattern to determine characteristics of the laser beam that passed through the crystal wherein the light from the crystal is observed in a direction perpendicular to the path of the laser beam through the crystal in order to view a longitudinal representation of the beam to determine a longitudinal intensity distribution profile.

6. A method for monitoring an ultraviolet laser beam comprising:
   disposing in the path of the ultraviolet laser beam a substantially transparent crystal that will produce a color pattern in response to ultraviolet radiation;
   exposing the crystal to the ultraviolet laser beam to produce a color pattern in the crystal corresponding to the laser beam intensity distribution;
   exposing the crystal and color pattern to light; and
   observing the light from said crystal and color pattern to determine characteristics of the laser beam that passed through the crystal wherein the light from the crystal is observed in a direction oblique to the path of the beam through the crystal to determine beam divergence.

7. An apparatus for monitoring an ultraviolet laser beam comprising:
   a crystal responsive when exposed to ultraviolet light to produce a three-dimensional color pattern in the body of said crystal wherein the spatial distribution characteristics of said color patern corresponds to the spatial distribution characteristics of the ultraviolet light directed through the crystal;
   means for disposing said crystal in the path of the ultraviolet laser beam;
   means for exposing the crystal to the laser beam for a time period to produce a color pattern in said crystal; and
   means for exposing the crystal to light so as to illuminate the color pattern and to observe the special distribution characteristics color pattern in said crystal.

8. The apparatus of claim 7 wherein said crystal is an alkali halide.

9. The apparatus of claim 7 wherein said crystal has at least one planar face perpendicular to the path of the beam through the crystal.

10. The apparatus of claim 7 further comprising a camera disposed for producing an electrical signal representing an image of the color pattern in said crystal.

11. The apparatus of claim 7 further comprising:
    a camera disposed for producing an electrical signal representing an image of the color pattern in said crystal; and
    a digital image processor connected to receive the electrical signal and produce a digital signal corresponding to an image of the color pattern.

12. An apparatus for monitoring an ultraviolet laser beam comprising;
    a crystal responsive when exposed to ultraviolet light to produce color patterns in said crystal corresponding to intensity distribution of the ultraviolet light wherein said crystal is an alkali halide crystal doped with thallium;
    means for disposing said crystal in the path of the ultraviolet laser beam;
    means for exposing the crystal to the laser beam for a time period to produce a color pattern in said crystal; and
    means for exposing the crystal to light for observing the color pattern in said crystal.

13. An apparatus for monitoring an ultraviolet laser beam comprising:
    a crystal responsive when exposed to ultraviolet light to produce color patterns in said crystal corresponding to intensity distribution of the ultraviolet light wherein said crystal is potassium chloride doped with thallium;
    means for disposing said crystal in the path of the ultraviolet laser beam;
    means for exposing the crystal to the laser beam for a time period to produce a color pattern in said crystal; and
    means for exposing the crystal to light for observing the color pattern in said crystal.

14. An apparatus for monitoring an ultraviolet laser beam comprising:
    a crystal responsive when exposed to ultraviolet light to produce color patterns in said crystal corresponding to intensity distribution of the ultraviolet light;
    means for disposing said crystal in the path of the ultraviolet laser beam so that said crystal has at least one planar face parallel to the path of the beam through the crystal;
    means for exposing the crystal to the laser beam for a time period to produce a color pattern in said crystal; and
    means for exposing the crystal to light for observing the color pattern in said crystal.

15. An apparatus for monitoring an ultraviolet laser beam comprising:
    a crystal responsive when exposed to ultraviolet light to produce color patterns in said crystal corresponding to intensity distribution of the ultraviolet light;
    means for disposing said crystal in the path of the ultraviolet laser beam;
    means for exposing the crystal to the laser beam for a time period to produce a color pattern in said crystal; and
    means for exposing the crystal to light for observing the color pattern in said crystal, said means for disposing and said means for exposing said crystal to the laser beam include
    a box that is substantially opaque at least to ultraviolet light for containing said crystal and substantially shielding it from light;
    means for mounting said crystal within said box in the path of the laser beam;
    shutter means disposed in the path of the laser beam for exposing said crystal to the laser for a selected time period.

16. The apparatus of claim 15 wherein said box is substantially opaque to ultraviolet light but is substantially transparent to visible light.

17. The apparatus of claim 15 wherein said box is substantially opaque to visible and ultraviolet light.

* * * * *

UNITED STATES PATENT AND TRADEMARK OFFICE
CERTIFICATE OF CORRECTION

PATENT NO. : 4,792,690

DATED : December 20, 1988

INVENTOR(S) : Michael P. McCann et al.

It is certified that error appears in the above-identified patent and that said Letters Patent is hereby corrected as shown below:

On the Title page under the subtitle Inventors, add --Steven D. Kramer, Alexandria, VA.--.

Column 2, line 53, "throgh" should be --through--.

Column 5, line 40, "patern" should be --pattern--.

Signed and Sealed this

Eighth Day of August, 1989

Attest:

DONALD J. QUIGG

Attesting Officer

Commissioner of Patents and Trademarks